(12) United States Patent
Tsumura et al.

(10) Patent No.: US 9,925,857 B1
(45) Date of Patent: Mar. 27, 2018

(54) CASE STRUCTURE OF POWER EQUIPMENT UNIT

(71) Applicant: HONDA MOTOR CO., LTD., Tokyo (JP)

(72) Inventors: Yuta Tsumura, Saitama (JP); Jun Ogawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/678,223

(22) Filed: Aug. 16, 2017

(30) Foreign Application Priority Data

Sep. 2, 2016 (JP) ................................. 2016-171807

(51) Int. Cl.
*B60K 1/04* (2006.01)
*B60K 1/00* (2006.01)

(52) U.S. Cl.
CPC .......... *B60K 1/04* (2013.01); *B60K 2001/005* (2013.01); *B60K 2001/0422* (2013.01)

(58) Field of Classification Search
CPC ...... B60K 2001/005; B60K 2001/0422; B60K 2001/0433; B60K 1/00; B60K 1/04
See application file for complete search history.

(56) References Cited

U.S. PATENT DOCUMENTS

| 5,606,239 | A | * | 2/1997 | Schumann | B60K 1/04 336/55 |
| 5,620,057 | A | * | 4/1997 | Klemen | B60K 1/04 180/65.1 |
| 7,398,849 | B2 | * | 7/2008 | Yoshida | B60K 1/04 180/68.5 |
| 8,464,817 | B2 | * | 6/2013 | Usami | B60K 1/04 180/68.5 |
| 2014/0262573 | A1 | * | 9/2014 | Ito | B60K 1/04 180/68.5 |

FOREIGN PATENT DOCUMENTS

| JP | 2010-285070 A | 12/2010 |
| JP | 2012-099288 A | 5/2012 |

* cited by examiner

*Primary Examiner* — John D Walters
*Assistant Examiner* — James J Triggs
(74) *Attorney, Agent, or Firm* — Paratus Law Group, PLLC

(57) ABSTRACT

A case structure of a power equipment unit includes: a case body having an upper portion opened to accommodate a power equipment; a lid member which covers the upper portion of the case body; and a cover member which is attached to the lid member and covers at least a first opening part formed in the lid member. The cover member has an intake port, the lid member has a second opening part which is provided with a maintenance/inspection plug of the power equipment so as to be adjacent to the first opening part, a space part is formed between the cover member and the lid member, the space part has a drain passage for discharging liquid to the outside, and the second opening part and the drain passage are located opposite to each other with the first opening part interposed therebetween.

9 Claims, 7 Drawing Sheets

CASE STRUCTURE OF POWER EQUIPMENT UNIT

CROSS-REFERENCE TO RELATED APPLICATION(S)

This application claims priority from Japanese Patent Application No. 2016-171807 filed on Sep. 2, 2016, the entire contents of which are incorporated herein by reference.

FIELD

The present invention relates to a case structure of a power equipment unit which accommodates a power equipment such as a vehicle driving battery.

BACKGROUND

A battery (battery module) is mounted on a hybrid vehicle which travels using an engine and a motor in combination, an electric vehicle which travels only using a motor, and the like to store electric power and supply the electric power to the motor (for example, JP-A-2010-285070 and JP-A-2012-099288). The battery is accommodated generally as a part of a power equipment unit in a case together with high-voltage electrical components including an inverter and the like.

The case of the power equipment unit has an intake port for taking cooling air into the case. In a structure where the case of the power equipment unit is disposed in a passenger compartment, however, when an occupant spills a large amount of liquid such as drink near the power equipment unit, there is a risk that the liquid flows from the intake port into the case of the power equipment unit. When the large amount of liquid flows into the case of the power equipment unit, there is a risk that the battery is flooded. From such reasons, the intake port of the case desirably adopts such a liquid infiltration preventing structure that the liquid is not easily infiltrated into the case even in a case where the large amount of liquid is spilled.

On the other hand, the power equipment unit is provided with a maintenance/inspection plug which is a switch for shutting off a circuit of the battery and performs work safely at the time of performing maintenance of the battery. Since electric parts constituting a part of the circuit of the battery are disposed in the periphery of the maintenance/inspection plug, it is preferable to cool it appropriately.

However, when being disposed close to the intake port, the maintenance/inspection plug is likely to be affected by the liquid infiltration preventing structure of the above-described intake port, and thus the maintenance/inspection plug may highly be subjected to flooding.

SUMMARY

The invention is to provide a case structure of a power equipment unit capable of reducing the influence of flooding on a maintenance/inspection plug while cooling the surrounding of the maintenance/inspection plug.

The invention provides following aspects (1) to (9).

(1) A case structure of a power equipment unit (e.g. a power equipment unit 20) which accommodates a power equipment (e.g. a battery 50) mounted in a vehicle (e.g. a vehicle 1), the case structure including:

a case body (e.g. a case body 31) having an upper portion opened to accommodate the power equipment;

a lid member (e.g. a lid member 40) which covers the upper portion of the case body; and a cover member (e.g. a first cover member 60) which is attached to the lid member and covers at least a first opening part (e.g. a first opening part 41) formed in the lid member, wherein the cover member has an intake port (e.g. an intake port 65) which takes in air from outside, the lid member has a second opening part (e.g. a second opening part 47) which is provided with a maintenance/inspection plug (e.g. a maintenance/inspection plug 21) of the power equipment so as to be adjacent to the first opening part, a space part is (e.g. a space part 71) formed between the cover member and the lid member, the space part has a drain passage (e.g. a drain passage 44) for discharging liquid, which infiltrates into the space part from the intake port, to the outside, and the second opening part and the drain passage are located opposite to each other with the first opening part interposed therebetween.

(2) The case structure of the power equipment unit according to aspect (1), wherein the first opening part is surrounded by a first circumferential wall (e.g. a first circumferential wall 42) having a cylindrical shape, the first circumferential wall is surrounded by a recess part (e.g. a recess part 43), and the drain passage is connected with the recess part.

(3) The case structure of the power equipment unit according to aspect (1) or (2), wherein the second opening part is surrounded by a second circumferential wall (e.g. a second circumferential wall 48) having a cylindrical shape, and the second circumferential wall is inclined downward as being away from the intake port.

(4) The case structure of the power equipment unit according to aspect (3), wherein an outer circumferential part (e.g. an outer circumferential part 49) surrounding the second circumferential wall is inclined downward as being away from the intake port.

(5) The case structure of the power equipment unit according to any one of aspects (1) to (4), wherein the second opening part is covered with a cover member (e.g. a second cover member 80) provided detachably.

(6) The case structure of the power equipment unit according to any one of aspects (1) to (5), wherein the cover member is provided with a partition wall part (e.g. a partition wall part 67) extending downward from an upper wall (e.g. an upper wall 61) between the intake port and the first opening part, and a lower end of the partition wall part is located below an upper end of the first opening part, and below a lower end of the intake port.

(7) The case structure of the power equipment unit according to any one of aspects (1) to (6), wherein the power equipment includes a vehicle driving battery (e.g. a battery 50).

(8) The case structure of the power equipment unit according to any one of aspects (1) to (7), wherein the power equipment unit is disposed under a seat (e.g. a front seat 5).

(9) The case structure of the power equipment unit according to aspect (8), wherein the intake port is disposed to be positioned under the seat even in a state where the seat moves to a most front side or a most rear side of the vehicle.

According to the aspect (1), the drain passage for discharging the liquid infiltrated into the space part from the intake port is provided in the space part between the cover member and the lid member. Thus, the liquid infiltrated from the intake port can be drained from the drain passage without being infiltrated into the first opening part of the lid member. In addition, the drain passage can be also used as an auxiliary intake passage in a case where the intake port is blocked, and thus the drain passage has an auxiliary intake function in addition to the drain function.

Further, since the lid member has the second opening part provided with the maintenance/inspection plug so as to be adjacent to the first opening part, it is possible to cool the electric parts around the maintenance/inspection plug by the flow of air to the intake port formed in the cover member covering the first opening part. On the other hand, when the maintenance/inspection plug is disposed close to the intake port, it is likely to be affected by the drain passage for discharging the liquid, which is infiltrated into the space part from the intake port, to the outside, but the influence of water on the maintenance/inspection plug can be reduced because the second opening part and the drain passage are disposed opposite to each other with the first opening part interposed therebetween.

According to the aspect (2), since the first opening part is surrounded by the first circumferential wall of the cylindrical shape, the liquid can be prevented from infiltrating into the case from the first opening part. Further, since the first circumferential wall is surrounded by the recess part and the drain passage is connected with the recess part, the liquid can be prevented from staying in the space part.

According to the aspect (3), since the second opening part is surrounded by the second circumferential wall of the cylindrical shape, the liquid can be prevented from infiltrating into the surrounding of the maintenance/inspection plug from the second opening part. Further, since the second circumferential wall is inclined downward as being separated away from the intake port, the liquid adhering to the second cover member can be avoided from flowing toward the intake port.

According to the aspect (4), since the outer circumferential part surrounding the second circumferential wall is inclined downward as being separated away from the intake port, the liquid adhering to the outer circumferential part of the second circumferential wall can be avoided from flowing to the intake port.

According to the aspect (5), since the second opening part is covered with another cover member provided detachably, it is possible to prevent erroneous operation of the maintenance/inspection plug and more reliably prevent the liquid from infiltrating into the surrounding of the maintenance/inspection plug from the second opening part.

According to the aspect (6), the cover member is provided with the partition wall part extending downward from the upper wall between the intake port and the first opening part, and the lower end of the partition wall part is located below the upper end of the first opening part and below the lower end of the intake port, and thus the liquid infiltrating from the intake port can be more effectively prevented from infiltrating into the first opening part.

According to the aspect (7), the vehicle driving battery is cooled by the air taken in from the intake port, and thus, it is possible to avoid a risk that the battery is exposed to the liquid.

According to the aspect (8), normally, even in a case where the occupant sitting on the seat spills liquid such as drink held by the container, the liquid rarely reaches the lower side of the seat, and thus, the liquid can be effectively prevented from infiltrating into the surrounding of the maintenance/inspection plug from the second opening part and infiltrating into the case body from the intake port. That is, even in a case where the intake port is disposed below the seat, flooding can be avoided while cooling air is secured by a narrow gap between the floor surface and the seat to cool the maintenance/inspection plug and the power equipment. Further, it is possible to reduce unpleasantness of the occupant due to the effect of noise during cooling.

According to the aspect (9), the second opening part and the intake port are disposed to be positioned under the seat even in a state where the seat moves to a most front side or a most rear side of the vehicle. Thus, it is possible to prevent the infiltration of the liquid more effectively.

DETAILED DESCRIPTION

Figure 1:
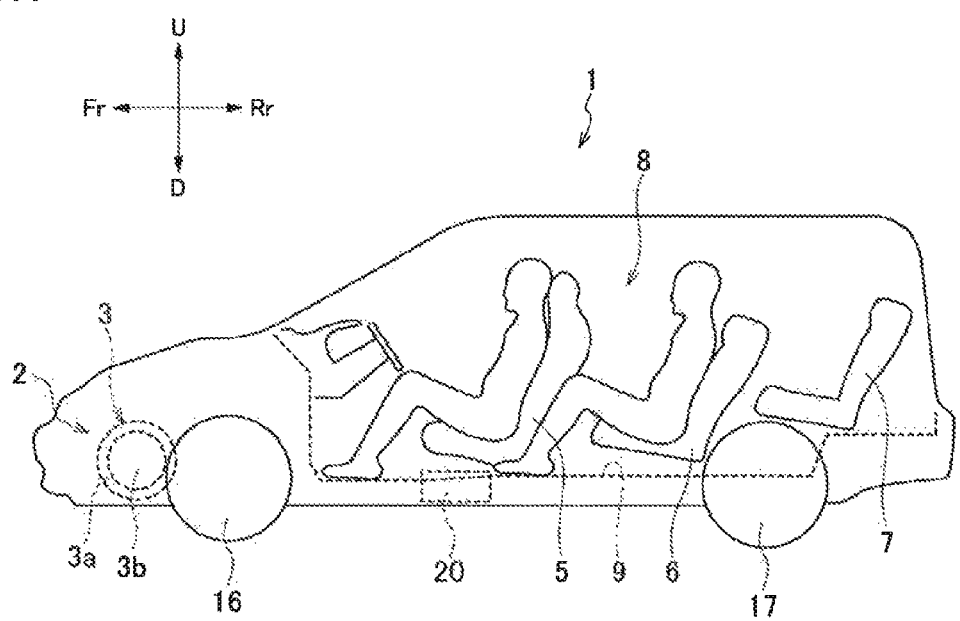
FIG. 1 is a schematic view illustrating a hybrid vehicle provided with a power equipment unit according to one embodiment of the present invention.

Hereinafter, one embodiment of the present invention will be described in detail with reference to the accompanying drawings. Incidentally, the drawings are viewed in directions indicated by reference numerals. In the following description, a front and rear side, a right and left side, and a vertical side follow directions in which a driver views. In the drawings, the front side of the vehicle is indicated by Fr, the rear side is indicated by Rr, the left side is indicated by L, and the right side is indicated by R, the upper side is indicated by U, and the lower side indicated by D.

FIG. 1 is a schematic view illustrating a hybrid vehicle in which a power equipment unit according to one embodiment of the present invention is mounted. The vehicle 1 is mounted with a power unit 3 in which an engine 3a and a motor generator 3b are installed in series in an engine room 2 in the front side of the vehicle. For example, the motor generator 3b is a three-phase AC motor. The vehicle 1 is a hybrid vehicle which is driven by the engine 3a and/or the motor generator 3b, and is capable of recovering electric power from the motor generator 3b during vehicle deceleration and the like.

In the vehicle 1, a driving force of the engine 3a and the motor generator 3b is transmitted to a front wheel 16 which is a driving wheel. A rear wheel 17 is a driven wheel. In addition, when the driving force is transmitted from the front wheel 16 to the motor generator 3b during deceleration of the vehicle 1 and the like, the motor generator 3b functions as a generator to generate a so-called regenerative braking force so that kinetic energy of the vehicle 1 is recovered as electric energy. The recovered electric energy is charged in a battery 50 (see FIG. 2) through an electric power converter such as an inverter included in a high-voltage device to be described later.

At the rear side of the engine room 2, a passenger compartment 8 is provided in which a front seat 5, a middle seat 6, and a rear seat 7 are disposed.

Figure 2:
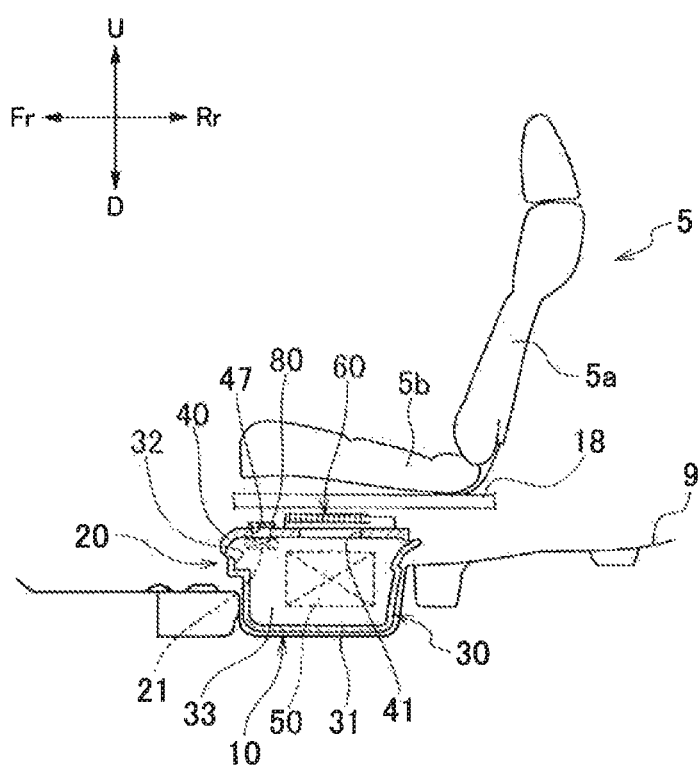
FIG. 2 is a schematic side view (partially sectional view) of the power equipment unit and a seat.

A power equipment unit 20 connected with the power unit 3 through an electric power cable (not illustrated) is disposed on the lower side of the front seat 5 (a driver's seat and a front passenger's seat) in the passenger compartment 8. FIG. 2 is a schematic side view (partially sectional view) of the power equipment unit 20 and the front seat 5. All components within the power equipment unit 20 excluding the battery 50 and a maintenance/inspection plug 21 are not illustrated.

As illustrated in FIG. 2, the front seat 5 is provided on the upper side of a floor panel 9 in the passenger compartment 8. The front seat 5 includes a back rest part 5a and a seat part 5b, and is attached in a seat rail 18 extending on the upper side of the floor panel 9 in a front and rear direction, so as to be supported to be slidingly movable in the same direction.

A recessed power equipment unit accommodating part 10 is provided on the lower side of the front seat 5 of the floor panel 9, and the power equipment unit 20 is accommodated in the power equipment unit accommodating part 10. The power equipment unit 20 is a unit which includes the battery 50, the high-voltage device and a power distribution component (not illustrated) for controlling giving and receiving of the electric power of the battery 50, the maintenance/inspection plug 21, and a case 30 which accommodates those components.

The case 30 of the power equipment unit 20 includes a bottomed container-shaped case body 31, a lid member 40 which covers the upper portion of the case body 31, a first cover member 60 which covers a first opening part 41 provided in the lid member 40, and a second cover member 80 which detachably covers a second opening part 47 provided in the lid member 40. The battery 50, the high-voltage device, the power distribution component (high-voltage power distribution component), the maintenance/inspection plug 21 and the like are accommodated inside the case body 31. The case body 31 is shaped in a bottomed container which has an opening 32 directed to the upper side of the vehicle 1. The interior thereof serves as an accommodating part 33 for accommodating the battery 50 and the like. The lid member 40 is a substantially plate-shaped member which blocks the opening 32 of the case body 31.

Although not illustrated in detail, the battery 50 is provided in a state where a plurality of battery cells are bundled together. In addition, the high-voltage device is electronic equipment including the inverter and a DC/DC converter. Electronic equipment such as ECU is also provided in the high-voltage device. By the function of the high-voltage device, direct current is obtained from the battery 50, the direct current is converted into three-phase alternating current, the current is supplied to the motor generator 3b to drive it, and regenerative current from the motor generator 3b is converted into direct current, thereby enabling the battery 50 to be charged.

Figure 3:
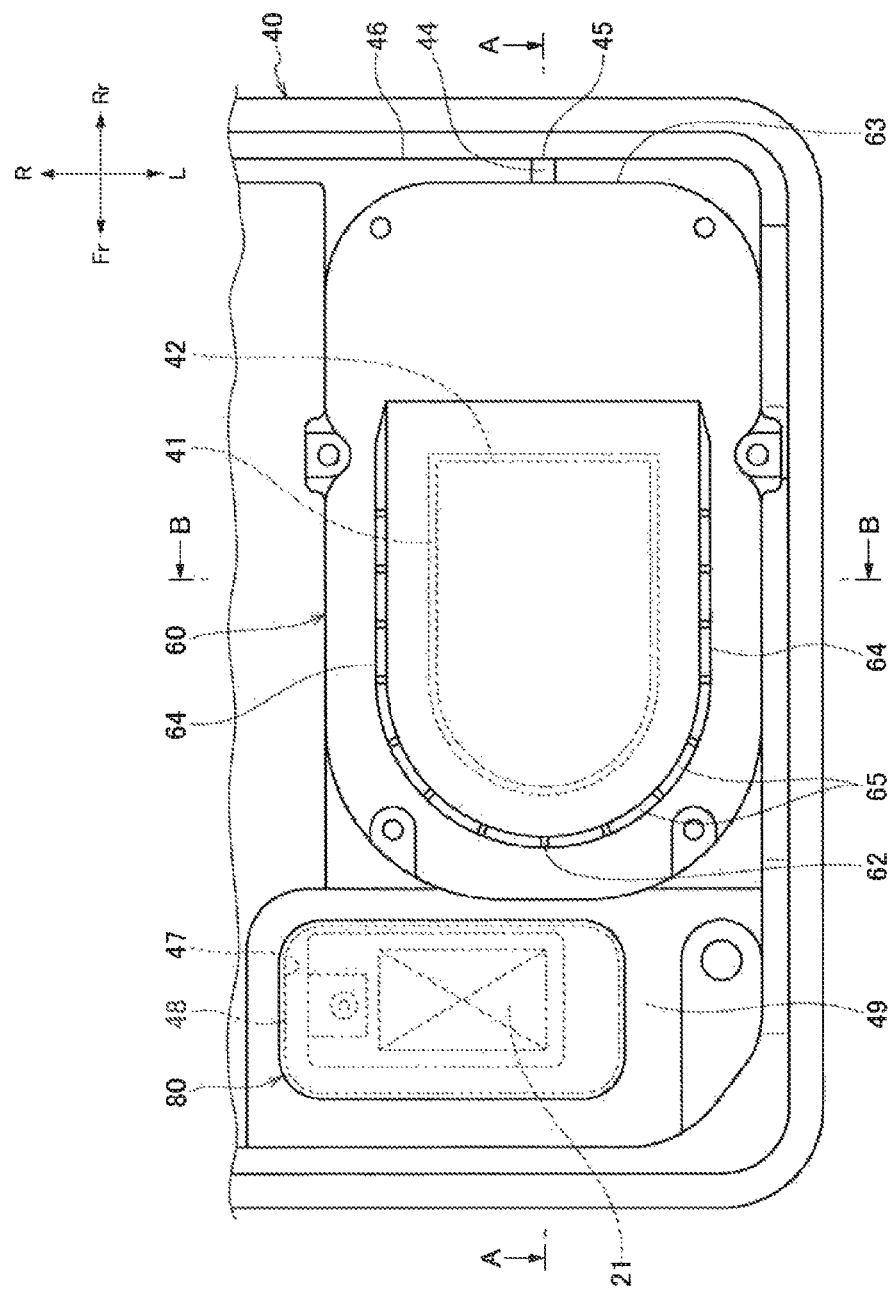
FIG. 3 is a partial plan view illustrating a lid member, a first cover member, and a second cover member of the power equipment unit.
Figure 4:
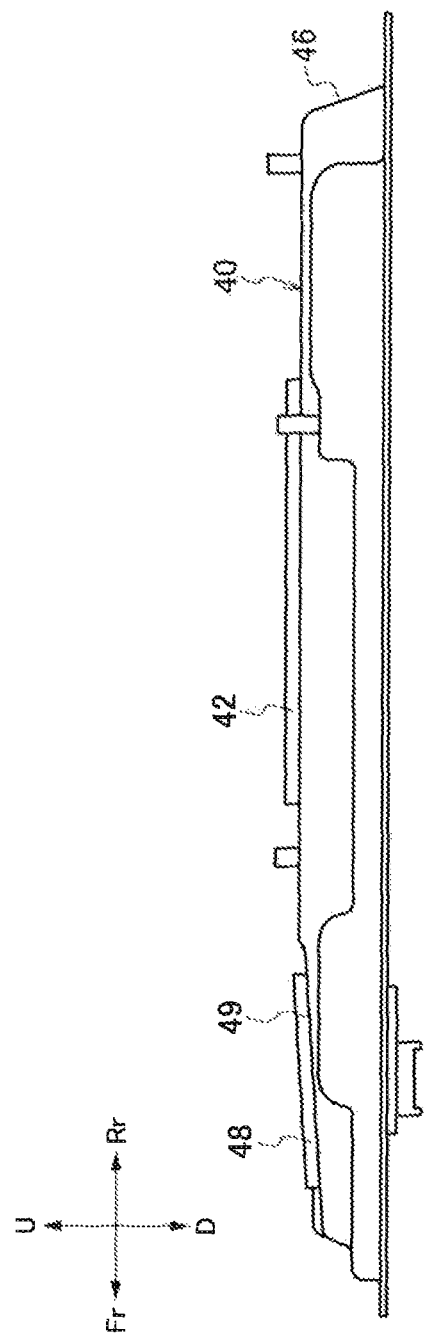
FIG. 4 is a side view of the lid member of the power equipment unit.
Figure 5A:
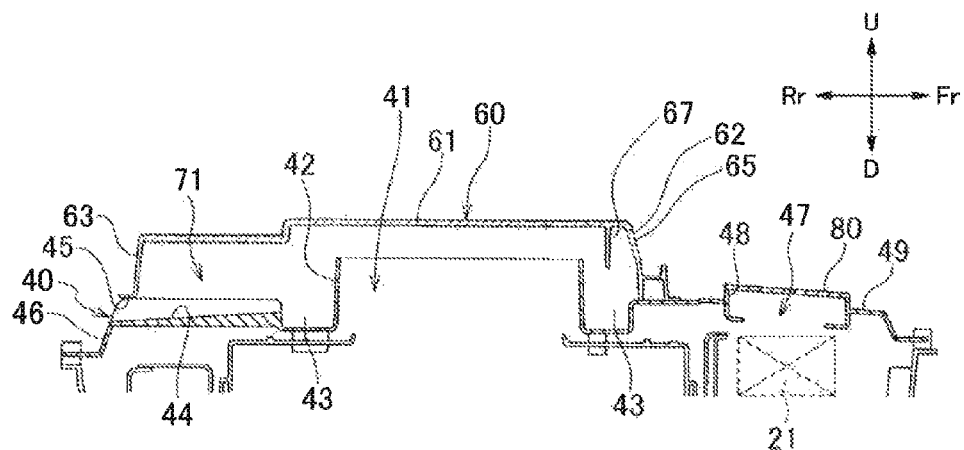
FIG. 5A is a sectional view taken along an arrow A-A of FIG. 3.
Figure 5B:
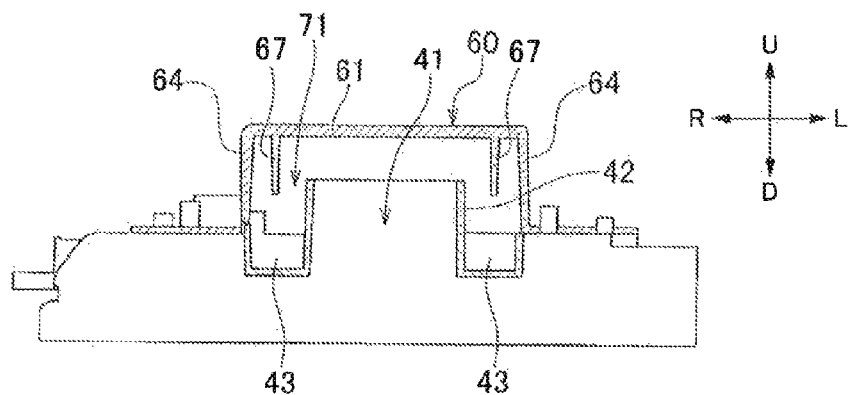
FIG. 5B is a sectional view taken along an arrow B-B of FIG. 3.

FIG. 3 is a partial plan view of the lid member 40, the first cover member 60, and the second cover member 80 of the power equipment unit 20, FIG. 4 is a side view of the lid member 40 of the power equipment unit 20, FIG. 5A is a sectional view taken along an arrow A-A of FIG. 3, and FIG. 5B is a sectional view taken along an arrow B-B of FIG. 3.

The lid member 40 is attached to cover the upper portion of the case body 31, and the entire body thereof has a substantially plate shape. A first opening part 41 and a second opening part 47 are formed in the lid member 40. The first opening part 41 is formed of an elliptic through hole communicating with the inside of the case body 31. The second opening part 47 is disposed adjacent to the first opening part 41 and formed of a rectangular through hole in front of the first opening part 41. A first cylindrical circumferential wall 42 surrounding the first opening part 41 and a second cylindrical circumferential wall 48 surrounding the second opening part 47 are provided on the upper surface of the lid member 40. In addition, a recess part 43 concaved in downward is formed on the outer circumferential side of the first circumferential wall 42. The recess part 43 is formed circumferentially in all directions of the first opening part 41 to surround the outer circumference of the first circumferential wall 42. That is, the first circumferential wall 42 is surrounded by the recess part 43. By the first circumferential wall 42, the upper end of the opening part 41 reaches a position higher than the circumference of the recess part 43 of the lid member 40.

The first cover member 60 includes an upper wall 61, which is disposed on the upper surface side of the lid member 40 to cover the first opening part 41 and the upper side of the vicinity thereof, and a front wall 62, a rear wall 63, and the right and left side walls 64 which extend downward from the circumferential edge of the upper wall 61. In addition, an intake port 65 formed of a plurality of slit-shaped through holes is formed in the front wall 62 of the first cover member 60. The intake port 65 is provided in the front wall 62 and the side wall 64 of the first cover member 60. The intake port 65 is an intake port for taking cooling air into the power equipment unit 20, and the air taken in from the intake port 65 cools the battery 50 and the like through the first opening part 41 of the lid member 40.

The power equipment unit 20 has a space part 71 surrounded by the first cover member 60 and the lid member 40. A partition wall part 67 has a thin-plate shape, and the partition wall part 67 extends just downward from the upper wall 61 of the first cover member 60 to oppose the intake port 65 is provided in the space part 71. The lower end of the partition wall part 67 is positioned below the upper end of the first opening part 41 (first circumferential wall 42) and below the lower end of the intake port 65. By partitioning the intake port 65 and the space part 71 by the partition wall part 67, a passage which reaches from the intake port 65 to the space part 71 becomes a labyrinth shape. The partition wall part 67 extends on the left side and the right side of the first opening part 41 as well as the front side of the first opening part 41.

A drain passage 44 which communicates with a drain port 45 formed in a rear vertical wall 46 of the lid member 40 is connected with the rear end of the recess part 43. That is, the recess part 43 communicates with the outside of the space part 71 through the drain passage 44 and the drain port 45. Similarly to the recess part 43, the drain passage 44 is formed by concaving the lid member 40. The bottom surface of the recess part 43 may be a horizontal plane, and may be an inclined surface in which the drain passage 44 is set as a lowermost portion.

As described above, the second opening part 47 and the drain passage 44 are located opposite to each other in the front and rear direction with the first opening part 41 interposed therebetween. The second opening part 47 located in front of the first opening part 41 is provided with the maintenance/inspection plug 21 which is a switch for shutting off the circuit of the battery 50 and performing safe work at the time of performing the maintenance of the battery 50. By the removal of the second cover member 80 covering the second opening part 47, it is possible to access the maintenance/inspection plug 21 from the second opening part 47.

The second opening part 47 is covered in a state where the second circumferential wall 48 surrounding the second opening part 47 is inclined downward as being separated away frontward from the intake port 65 and the second cover member 80 is also gradually inclined toward the front. In addition, an outer circumferential part 49 surrounding the second circumferential wall 48 is also inclined downward as being separated away frontward from the intake port 65. Accordingly, it is possible to avoid the liquid adhering to the second cover member 80 or the outer circumferential part 49 from flowing toward the intake port 65.

Figure 6:
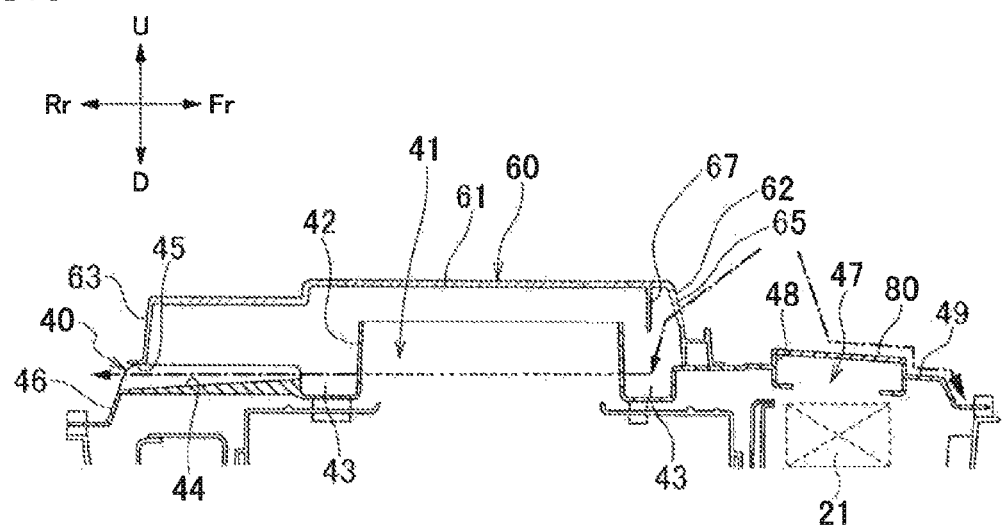
FIG. 6 is a diagram for explaining a flow of liquid in a case where the lid member is subjected to flooding.

FIG. 6 is a diagram for explaining a flow of liquid in a case where the lid member 40 is subjected to flooding. As illustrated in the same drawing, in a case where a large amount of liquid such as water is spilled in the vicinity of the front seat 5 in the passenger compartment 8, the liquid may be infiltrated from the intake port 65 of the first cover member 60 into the case 30. In this case, the liquid infiltrated from the intake port 65 enters into the recess part 43 of the first opening part 41 on the front side, and is guided to the space part 71 therefrom. In this case, in a case where the liquid is vigorously infiltrated from the intake port 65, the liquid is caught by the partition wall part 67 to drip just downward, and enters into the recess part 43. By such a partition wall part 67, it can be prevented that the liquid infiltrated from the intake port 65 reaches the first opening part 41 without being disturbed.

The liquid reaching the space part 71 in this manner flows the space part 71 from the front side to the rear side when the vehicle 1 travels deceleratingly or in a case where the vehicle 1 travels the climbing road so that the vehicle 1 is inclined in the front and rear direction. That is, the liquid flows in a direction away from the second opening part 47 provided with the maintenance/inspection plug 21. Since the drain passage 44 is connected with the rear end of the recess part 43, the liquid flowing to the space part 71 from the front side to the rear side is discharged from the drain port 45 outside the space part 71 through the drain passage 44. Accordingly, the liquid such as water infiltrated from the intake port 65 can be prevented from entering into the case body 31 from the first opening part 41, and thus is discharged outside from the space part 71.

On the other hand, since the second cover member 80 and the outer circumferential part 49 are inclined downward as being separated away frontward from the intake port 65, the liquid dropped on the second cover member 80 or the outer circumferential part 49 surrounding the second circumferential wall 48 flows toward the front of the lid member 40 in the direction away from the intake port 65.

As described above, according to the power equipment unit 20 of this embodiment, the drain passage 44 for discharging the liquid infiltrated into the space part 71 from the intake port 65 is provided in the space part 71 between the first cover member 60 and the lid member 40. Thus, the liquid infiltrated from the intake port 65 can be drained from the drain port 45 through the drain passage 44 without being infiltrated into the first opening part 41 of the lid member 40. In addition, the drain passage 44 can be also used as an auxiliary intake passage in a case where the intake port 65 is blocked, and thus the drain passage 44 has an auxiliary intake function in addition to the drain function.

Further, since the lid member 40 is formed with the second opening part 47 provided with the maintenance/inspection plug 21 so as to be adjacent to the first opening part 41, it is possible to cool the electric parts around the maintenance/inspection plug 21 by the flow of air to the intake port 65 formed in the first cover member 60 covering the first opening part 41. On the other hand, when the maintenance/inspection plug 21 is disposed close to the intake port 65, it is likely to be affected by the drain passage 44 for discharging the liquid, which is infiltrated into the space part 71 from the intake port 65, to the outside, but the influence of water on the maintenance/inspection plug 21 can be reduced because the second opening part 47 and the drain passage 44 are disposed opposite to each other with the first opening part 41 interposed therebetween.

Since the first opening part 41 is surrounded by the first circumferential wall 42 of the cylindrical shape, the liquid can be prevented from infiltrating into the case from the first opening part 41. Further, since the first circumferential wall 42 is surrounded by the recess part 43 and the drain passage 44 is connected with the recess part 43, the liquid can be prevented from staying in the space part 71.

Since the second opening part 47 is surrounded by the second circumferential wall 48 of the cylindrical shape, the liquid can be prevented from infiltrating into the surrounding of the maintenance/inspection plug 21 from the second opening part 47. Further, since the second circumferential wall 48 is inclined downward as being separated away from the intake port 65, the liquid adhering to the second cover member 80 can be avoided from flowing toward the intake port 65.

In addition, since the second opening part 47 is covered with the second cover member 80 provided detachably, it is possible to prevent erroneous operation of the maintenance/inspection plug 21 and more reliably prevent the liquid from infiltrating into the surrounding of the maintenance/inspection plug 21 from the second opening part 47. A seal member may be provided between the second cover member 80 and the second circumferential wall 48.

The first cover member 60 is provided with the partition wall part 67 extending downward from the upper wall 61 between the intake port 65 and the first opening part 41, and the lower end of the partition wall part 67 is located below the upper end of the first opening part 41 (first circumferential wall 42) and below the lower end of the intake port 65, and thus the liquid infiltrating from the intake port 65 can be more effectively prevented from infiltrating into the first opening part 41.

Since the power equipment unit 20 is disposed below the front seat 5, normally, even in a case where the occupant sitting on the front seat 5 spills liquid such as drink held by the container, the liquid rarely reaches the lower side of the front seat 5, and thus, the liquid can be effectively prevented from infiltrating into the surrounding of the maintenance/inspection plug 21 from the second opening part 47 and infiltrating into the case body 31 from the intake port 65. That is, even in a case where the intake port 65 is disposed below the front seat 5, flooding can be avoided while cooling air is secured by a narrow gap between the floor surface and the front seat 5 to cool the surrounding of the maintenance/inspection plug 21 and the battery 50. Further, it is possible to reduce unpleasantness of the occupant due to the effect of noise during cooling.

Figure 7A:
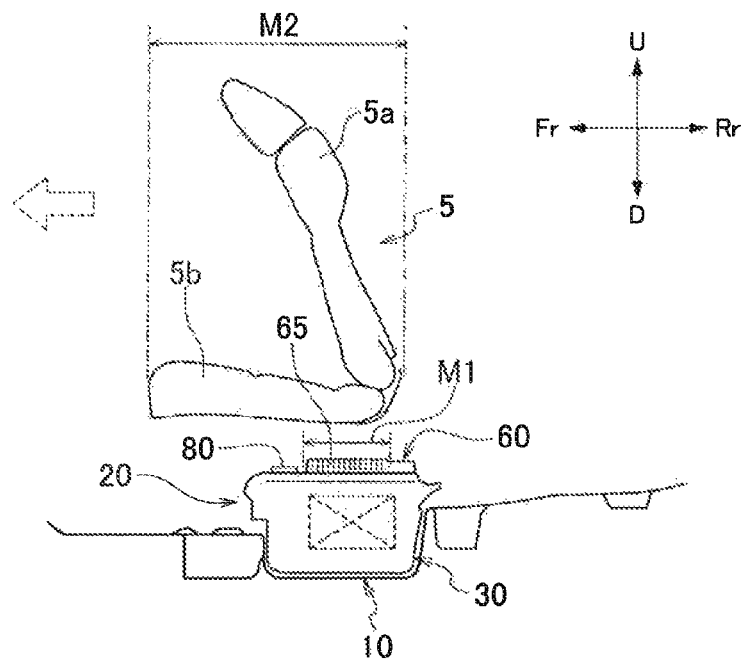
FIGS. 7A and 7B are schematic side views illustrating an arrangement configuration of the power equipment unit with respect to a front seat.
Figure 7B:
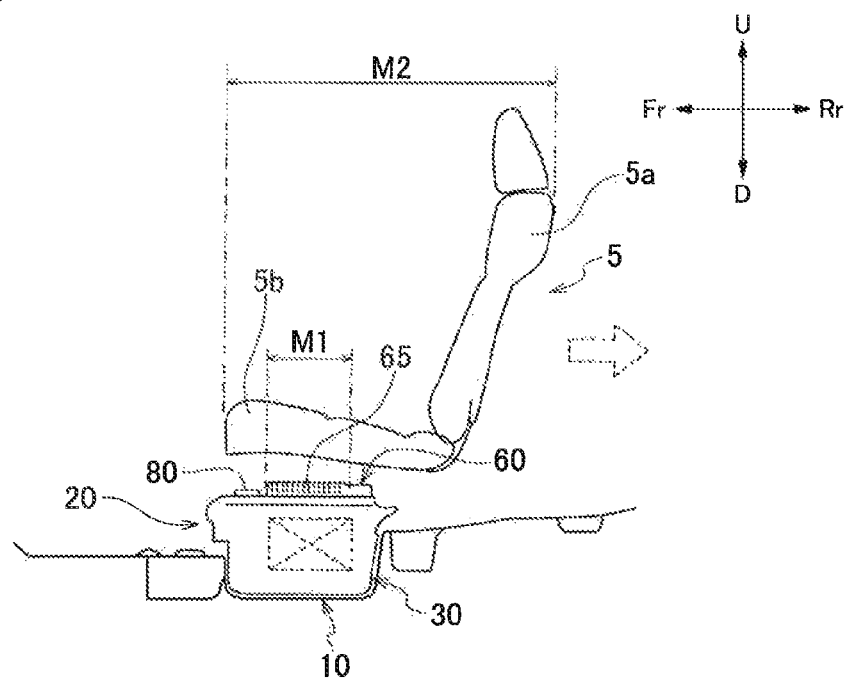

FIGS. 7A and 7B are views for explaining a position relation between the front seat 5 and the first cover member 60 and the second cover member 80. FIG. 7A is a view illustrating a state where the front seat 5 moving along the seat rail 18 (see FIG. 2) in the front and rear direction is positioned on a most front side. FIG. 7B is a view illustrating a state where the front seat 5 is positioned on a most rear side. Incidentally, in the same drawings, the seat rail 18 is not illustrated. As illustrated in the same drawings, in both the state where the front seat 5 is positioned on the most front side and the state where the front seat 5 is positioned on the most rear side, the intake port 65 of the first cover member 60 and the second opening part 47 covered with the second cover member 80 are right below the front seat 5. That is, even in the state where the front seat 5 moving along the seat rail 18 in the front and rear direction is in any positions, an intake port range M1 is configured to be included in a seat range M2.

In the case structure of this embodiment, in this manner, in any one of the state where the front seat 5 moves to the most front side of the vehicle 1 and the state where the front seat 5 moves to the most rear side, the second opening part 47 and the intake port 65 are configured to be positioned right under the front seat 5. Thus, it can be prevented more effectively that liquid such as water is infiltrated from the second opening part 47 and the intake port 65 into the case body 31.

Incidentally, the present invention is not limited to the above-described embodiment, but can be changed or improved properly.

For example, in the above-described embodiment, the power equipment unit accommodating part 10 accommodating the power equipment unit 20 is provided below the front seat 5. However, the power equipment unit accommodating part 10 may be provided below the middle seat 6 or below the rear seat 7 as well as below the front seat 5.

In addition, the battery 50 is exemplarily illustrated as power equipment. However, the power equipment is not limited to the battery, and may be an inverter, a DC/DC converter, and the like. In the power equipment unit, these components may be accommodated singly or in a combined form in a case.

In addition, the hybrid vehicle is exemplarily illustrated as the vehicle 1. However, the vehicle 1 is not limited thereto, and may be an electric vehicle, a fuel battery vehicle, and the like.

The invention claimed is:

1. A case structure of a power equipment unit which accommodates a power equipment mounted in a vehicle, the case structure comprising:
    a case body having an upper portion opened to accommodate the power equipment;
    a lid member which covers the upper portion of the case body; and
    a cover member which is attached to the lid member and covers at least a first opening part formed in the lid member, wherein
    the cover member has an intake port which takes in air from outside,
    the lid member has a second opening part which is provided with a maintenance/inspection plug of the power equipment so as to be adjacent to the first opening part,
    a space part is formed between the cover member and the lid member,
    the space part has a drain passage for discharging liquid, which infiltrates into the space part from the intake port, to the outside, and
    the second opening part and the drain passage are located opposite to each other with the first opening part interposed therebetween.

2. The case structure of the power equipment unit according to claim 1, wherein
    the first opening part is surrounded by a first circumferential wall having a cylindrical shape,
    the first circumferential wall is surrounded by a recess part, and
    the drain passage is connected with the recess part.

3. The case structure of the power equipment unit according to claim 1, wherein
    the second opening part is surrounded by a second circumferential wall having a cylindrical shape, and
    the second circumferential wall is inclined downward as being away from the intake port.

4. The case structure of the power equipment unit according to claim 3, wherein
    an outer circumferential part surrounding the second circumferential wall is inclined downward as being away from the intake port.

5. The case structure of the power equipment unit according to claim 1, wherein
    the second opening part is covered with a cover member provided detachably.

6. The case structure of the power equipment unit according to claim 1, wherein
    the cover member is provided with a partition wall part extending downward from an upper wall between the intake port and the first opening part, and
    a lower end of the partition wall part is located below an upper end of the first opening part, and below a lower end of the intake port.

7. The case structure of the power equipment unit according to claim 1, wherein
    the power equipment includes a vehicle driving battery.

8. The case structure of the power equipment unit according to claim 1, wherein
    the power equipment unit is disposed under a seat.

9. The case structure of the power equipment unit according to claim 8, wherein
    the intake port is disposed to be positioned under the seat even in a state where the seat moves to a most front side or a most rear side of the vehicle.

* * * * *